(12) United States Patent
Tagra et al.

(10) Patent No.: US 11,501,071 B2
(45) Date of Patent: Nov. 15, 2022

(54) WORD AND IMAGE RELATIONSHIPS IN COMBINED VECTOR SPACE

(71) Applicant: International Business Machines Corporation, Armonk, NY (US)

(72) Inventors: Ankur Tagra, Bangalore (IN); Sudheesh S. Kairali, Kozhikode (IN); Vijay Kalangumvathakkal, Pathanamthitta (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 16/923,123

(22) Filed: Jul. 8, 2020

(65) Prior Publication Data
US 2022/0012424 A1    Jan. 13, 2022

(51) Int. Cl.
*G06N 5/02* (2006.01)
*G06F 40/284* (2020.01)
(Continued)

(52) U.S. Cl.
CPC .......... *G06F 40/284* (2020.01); *G06F 40/30* (2020.01); *G06N 3/08* (2013.01); *G06N 20/00* (2019.01); *G06N 5/02* (2013.01); *G06V 10/82* (2022.01)

(58) Field of Classification Search
CPC ......... G06N 5/02; G06V 10/82; G06F 40/284
See application file for complete search history.

(56) References Cited

U.S. PATENT DOCUMENTS

| | | | |
|---|---|---|---|
| 7,092,871 B2 * | 8/2006 | Pentheroudakis .... | G06F 40/284 704/9 |
| 9,495,425 B1 * | 11/2016 | Kuznetsov ........ | G06F 16/24578 |

(Continued)

FOREIGN PATENT DOCUMENTS

WO    2018190792 A1    10/2018

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Feng-Tzer Tzeng
(74) *Attorney, Agent, or Firm* — Richard B. Thomas

(57) ABSTRACT

Embodiments relate to a system, program product, and method for leveraging cognitive systems to facilitate the management of word and image relationships in a combined vector space. More specifically, the system, computer program product, and method disclosed herein facilitate establishing one or more continuous semantic relationships with word vectors, sentence vectors, and image vectors within an image-word combined vector space with N-dimensional coordinates. In general, the word vectors, sentence vectors, and image vectors are generated within their respective domains that are resident within the image-word combined vector space. Such domains of word vectors, sentence vectors, and image vectors include inherent semantic relationships between respective members of each domain that facilitate establishing continuous, formal, virtual relationships between respective word vectors, image vectors, and sentence vectors within the image-word combined vector space.

20 Claims, 6 Drawing Sheets

(51) Int. Cl.
  G06N 3/08    (2006.01)
  G06N 20/00   (2019.01)
  G06F 40/30   (2020.01)
  *G06V 10/82*    (2022.01)

(56)              References Cited

U.S. PATENT DOCUMENTS 10,026,020  B2   7/2018   Jin
  2008/0215561 A1* 9/2008   Yu ........................ G06F 16/951
                                                           707/999.005
  2017/0011279 A1  1/2017   Soldevila
  2017/0127016 A1* 5/2017   Yu ........................ G06V 10/82
  2017/0206435 A1* 7/2017   Jin ........................ G06K 9/628
  2019/0034416 A1* 1/2019   Al Hasan ............. G06N 3/0454
  2019/0370337 A1  12/2019  Lee

OTHER PUBLICATIONS

MTank, (Jun. 4, 2018) Multi-Modal Methods: Image Captioning (From Translation to Attention), https://blog.mlreview.com/multi-modal-methods-image-captioning-from-translation-to-attention-895b6444256e. Retrieved from the internet on Mar. 8, 2022.

Rei, M., (Oct. 27, 2014) Linguistic Regularities in Word Representations, http://www.marekrei.com/blog/linguistic-regularities-word-representations/ Retrieved from the internet on Mar. 8, 2022.

* cited by examiner

WORD AND IMAGE RELATIONSHIPS IN COMBINED VECTOR SPACE

BACKGROUND

The present disclosure relates to cognitive systems and the management of word and image relationships in a combined vector space, and, more specifically, for establishing one or more continuous semantic relationships with word vectors, sentence vectors, and image vectors within the combined vector space.

Many known text analysis systems are able to generate word vectors to capture the semantic meanings of words through natural language processing (NLP) applications. In some of these known text analysis systems, text recognition based on semantic information determined through the vectors is employed. In at least some of the known text analysis systems, sentence vectors may be generated from the word vectors through a term frequency inverse document frequency (TF-IDF) algorithm. These sentence vectors may be tagged with sentiment labels to predict a sentiment with the sentence vectors and thereby determine a sentiment of the source text. Many known image analysis systems are able to generate image vectors from respective images. In some of these known image analysis systems, semantic concepts associated with these image vectors may be mapped to respective text for those systems that use text recognition and image retrieval based on semantic information. In some of these known systems, image classification includes establishing some limited number of semantic relationships between a narrow range of objects in an image and a narrow range of associated words.

SUMMARY

A system, computer program product, and method are provided for facilitating management of word and image relationships in a combined vector space, and, more specifically, for establishing one or more continuous semantic relationships with word vectors, sentence vectors, and image vectors within the combined vector space.

In one aspect, a computer system is provided to facilitate management of word and image relationships in a combined vector space through establishing one or more continuous semantic relationships with word vectors, sentence vectors, and image vectors within the combined vector space. The system includes a server including at least one processing device and at least one memory device operably coupled to the at least one processing device. The system also includes a knowledge base in operable communication with the server. The server is configured to transmit a plurality of image vectors to a vector space resident within the knowledge base. The server is also configured to transmit a plurality of caption sentence vectors to the vector space, wherein a respective portion of the plurality of caption sentence vectors have one or more semantic relationships with a respective portion of the plurality of image vectors, thereby defining one or more combined image-word semantic relationships. The server is further configured to transmit a plurality of textual content word vectors to the vector space. A respective portion of the plurality of word vectors have one or more semantic relationships with the respective portion of the plurality of image vectors and the respective portion of caption sentence vectors, thereby further defining the one or more combined image-word semantic relationships. The server is also configured to transmit a plurality of textual content sentence vectors to the vector space. A respective portion of the plurality of textual content sentence vectors have one or more semantic relationships with the respective portion of the plurality of image vectors, the respective portion of caption sentence vectors, and the respective portion of the word vectors, thereby further defining the one or more combined image-word semantic relationships. The server is further configured to establish one or more continuous semantic relationships through the one or more combined image-word semantic relationships.

In another aspect, a computer program product is provided to facilitate management of word and image relationships in a combined vector space through establishing one or more continuous semantic relationships with word vectors, sentence vectors, and image vectors within the combined vector space. The computer program product includes one or more computer readable storage media, and program instructions collectively stored on the one or more computer storage media. The product includes program instructions to transmit a plurality of image vectors to a vector space. The product also includes program instructions to transmit a plurality of caption sentence vectors to the vector space. A respective portion of the plurality of caption sentence vectors have one or more semantic relationships with a respective portion of the plurality of image vectors, thereby defining one or more combined image-word semantic relationships. The product further includes program instructions to transmit a plurality of textual content word vectors to the vector space. A respective portion of the plurality of word vectors have one or more semantic relationships with the respective portion of the plurality of image vectors and the respective portion of caption sentence vectors, thereby further defining the one or more combined image-word semantic relationships. The product also includes program instructions to transmit a plurality of textual content sentence vectors to the vector space. A respective portion of the plurality of textual content sentence vectors have one or more semantic relationships with the respective portion of the plurality of image vectors, the respective portion of caption sentence vectors, and the respective portion of the word vectors, thereby further defining the one or more combined image-word semantic relationships. The product further includes program instructions to establish one or more continuous semantic relationships through the one or more combined image-word semantic relationships.

In yet another aspect, a computer-implemented method is provided to facilitate management of word and image relationships in a combined vector space through establishing one or more continuous semantic relationships with word vectors, sentence vectors, and image vectors within the combined vector space. The method includes transmitting a plurality of image vectors to a vector space. The method also includes transmitting a plurality of caption sentence vectors to the vector space. A respective portion of the plurality of caption sentence vectors have one or more semantic relationships with a respective portion of the plurality of image vectors, thereby defining one or more combined image-word semantic relationships. The method further includes transmitting a plurality of textual content word vectors to the vector space. A respective portion of the plurality of word vectors have one or more semantic relationships with the respective portion of the plurality of image vectors and the respective portion of caption sentence vectors, thereby further defining the one or more combined image-word semantic relationships. The method also includes transmitting a plurality of textual content sentence vectors to the vector space. A respective portion of the plurality of textual content sentence vectors have one or more semantic relationships with the respective portion of the plurality of image vectors, the respective portion of caption sentence vectors, and the respective portion of the word vectors, thereby further defining the one or more combined image-word semantic relationships. The method further includes establishing one or more continuous semantic relationships through the one or more combined image-word semantic relationships.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
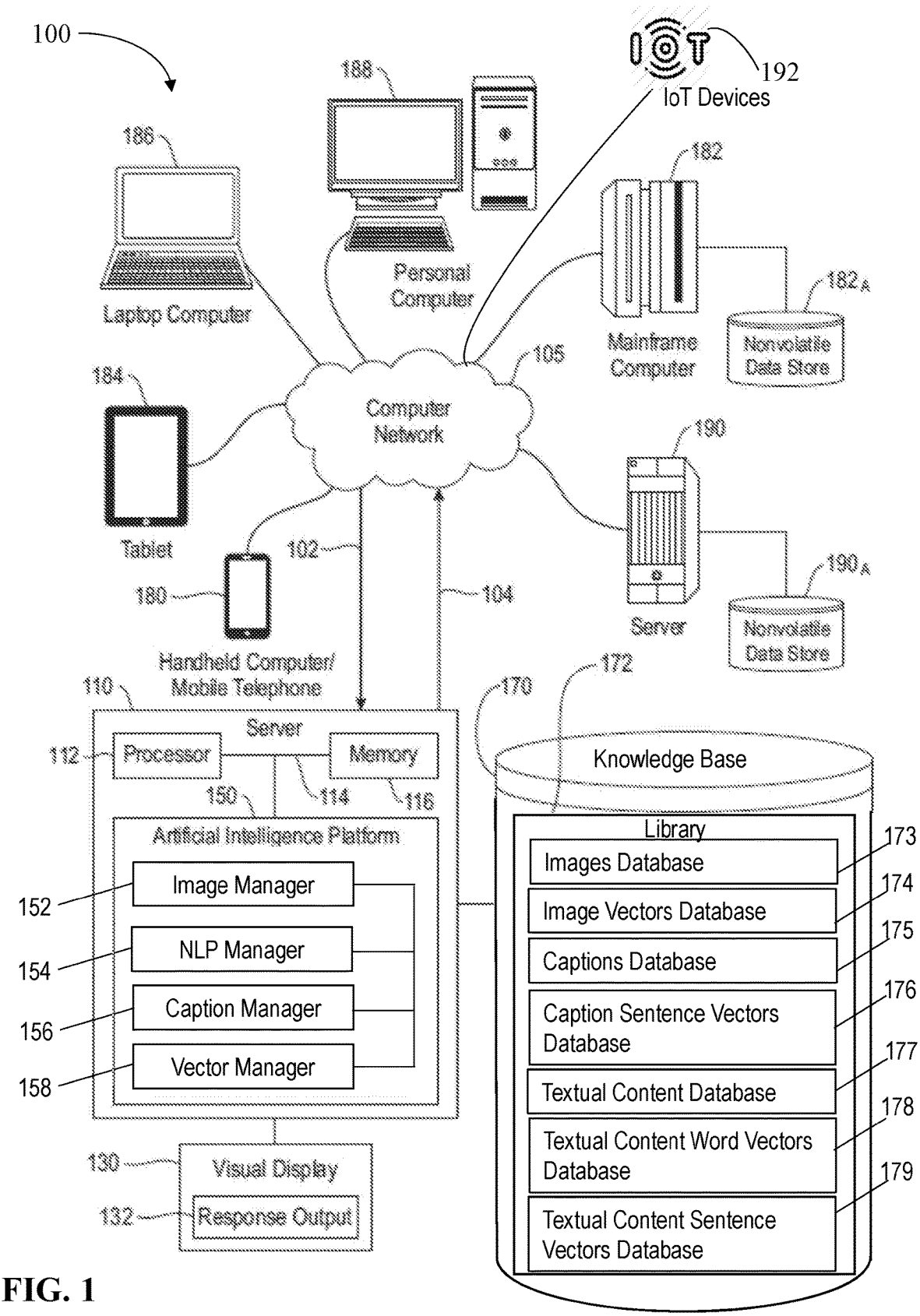
FIG. 1 is a schematic diagram illustrating a computer system including an artificial intelligence platform suitable for management of word and image relationships in a combined vector space, including establishing one or more continuous semantic relationships with word vectors, sentence vectors, and image vectors within the combined vector space, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but are merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known text analysis systems generate word vectors to capture the semantic meanings of words through natural language processing (NLP) applications. In some of these known text analysis systems, text recognition based on semantic information determined through the vectors is employed. In at least some of the known text analysis systems, sentence vectors may be generated from the word vectors through a term frequency inverse document frequency (TF-IDF) algorithm. These sentence vectors may be tagged with sentiment labels to predict a sentiment with the sentence vectors and thereby determine a sentiment of the source text. Many known image analysis systems are able to generate image vectors from respective images. In some of these known image analysis systems, semantic concepts associated with these image vectors may be mapped to respective text for those systems that use text recognition and image retrieval based on semantic information. Such semantically-based image-text mapping is sometimes referred to as a "primary relationship," where layered primary, secondary, and tertiary relationships are described further herein. In some of these known image analysis systems, image classification includes establishing some limited number of semantic relationships between a narrow range of objects in an image and a narrow range of associated words. In most of these known systems, the text vectors, the sentence vectors, and the image vectors are exclusively positioned within their respective domains with no direct semantic relationships established between the three domains.

A system, computer program product, and method are disclosed and described herein for leveraging cognitive systems to facilitate the management of word and image relationships in a combined vector space. More specifically, the system, computer program product, and method disclosed herein facilitate establishing one or more continuous semantic relationships with word vectors, sentence vectors, and image vectors within an image-word combined vector space with N-dimensional coordinates. In general, the word vectors, sentence vectors, and image vectors are generated within their respective domains that are resident within the image-word combined vector space. Such domains of word vectors, sentence vectors, and image vectors include semantic relationships between respective members of each domain that facilitate establishing continuous, formal, virtual relationships between respective word vectors, image vectors, and sentence vectors within the image-word combined vector space.

For example, and without limitation, the system, computer program product, and method as disclosed herein facilitate establishing a primary relationship between words and images. As an illustration of the primary relationship, an image of a cat and the word "cat" are joined in a semantic relationship due to the nature of the association of the image and the word. In addition, the system, computer program product, and method as disclosed herein facilitate establishing a secondary relationship between an image of a cat, an image of a dog, the word "cat", and the word "dog" as having a sematic relationship with other images and words that are related to "domestic animals."

Furthermore, the system, computer program product, and method as disclosed herein facilitate establishing a tertiary relationship between an image of a cat, an image of a dog, an image of a table, the word "cat", the word "dog," and the word "table" as having a deeper sematic relationship with other images and words that are related to one or the other of "animate objects" and "inanimate objects." The images and words related to cats and dogs have the primary and secondary relationships, where the secondary relationships may be under the label of "animate objects." The images and words associated with tables have the expected primary relationship, and the secondary relationship may be under the label of "inanimate objects." The tertiary relationships established between images and words associated with cats, dogs, and animate objects include features associated with distinguishing between "animate objects" and "inanimate objects." Similarly, the reciprocal tertiary relationships include furniture, such as tables, that include features associated with distinguishing between "inanimate objects, and "animate objects" such as cats and dogs. More specifically, in most situations, there is no real relationship between images of the animate objects (including cats and dogs) and images of the inanimate objects (such as tables). Therefore, in the system described herein, if the image of a dog is replaced with the word "dog," or the image of the cat is replaced with the word "cat," the relationships of the animate objects with the inanimate object do not change. Accordingly, the system disclosed herein will continue to distinguish between tables and cats.

Similar relationships, or lack thereof, are established between full sentences including the aforementioned semantic associations and the related words and images as well. For example, for an image of a dog under a table, the word dog, the word table, and a sentence such as "The dog is under the table," the system described herein distinguishes between the dog and the table. Accordingly, the system described herein uses an integrated model to capture the word-sentence-image semantic relationships.

In addition, the system, computer program product, and method as disclosed herein extrapolates the semantic relationships to those classes that are not predefined, but related. For example, similar relationships between domesticated rabbits and chairs are extrapolated from the existing semantic relationships (or absence thereof) between the domestic cats and dogs and inanimate tables. Accordingly, rather than merely representing images as a set of objects, the images reflect the overall context similar to that experienced by human senses. Accordingly, models as described herein developed using a continuous sematic relationship between a wide variety of image vectors, word vectors, and sentence vectors may be used as a launching point for leveraging the simulated human-level image sense identification, where those associated image vectors may be further used to train models using one or more of unsupervised or semi-supervised model training techniques.

In at least some embodiments, the system and methods described herein use word vectors, image vectors, and sentence vectors, within their respective domains, to define a plurality of semantic relationships in a unitary, N-dimensional image-word vector space. These semantic relationships define one or more continuous links between the vectors, and thereby, define continuous respective semantic relationships between the domains. In some embodiments, there are two independent training flows used to build the image-word combined vector space and train the models therein. One flow path is used to populate the combined vector space with images and respective captions in the form of image vectors and caption sentence vectors, respectively. The second flow path is used to populate the combined vector space with textual content word vectors and textual content sentence vectors using textual content pulled from a variety of textual content sources.

In at least some embodiments, the first data flow path uses image data input to build the image-word combined vector space and train the model therein. A plurality of images are captured to define a captured image data set, and the images are stored in an images database. The images receive a caption generated by a caption generator, through one or more captioning algorithms including, without limitation, convolutional neural network (CNN) and long short term memory (LSTM) networks, thereby generating a plurality of captioned images. The captions are generated with substantial accuracy directed toward the object, or objects, in the images. The captions are stored in a captions database.

In some embodiments, the captioned images are analyzed for their contextual content and the relevance of the contextual content is determined. For example, and without limitation, one set of images of real estate may be captioned as "real estate with lakes" and a second set of real estate images may be captioned as "real estate with woods." In at least one embodiment, the images of both sets of images are further processed and the filtering features of the model under construction are enhanced. In some embodiments, the images of either set may be blocked from further analyses based on a filtering mechanism added to the context/relevance analyzer to facilitate reducing unnecessary downstream processing. In at least some embodiments, the contextual interpretation of the captioning is semi-supervised. Accordingly, a contextual review of the captioned images to determine a contextual relevance of the image is applied to the captioned images, where the captioned images may be filtered based on the respective contextual relevance, and unrelated images can be removed prior to further analysis.

In one or more embodiments, the relevant images are vectorized through an image vectorizer algorithm and the image vectors are stored in an image vectors database that at least partially defines an image vectors domain within the image-word combined vector space. Accordingly, the image vectors are used for defining semantic relationships within the image-word combined vector space.

In at least one embodiment, the relevant captions and the respective relevant images are further processed. In at least one embodiment the captions of the images are tokenized through a tokenizer, i.e., each word in the caption is tokenized into an individual token. The tokenizer is any algorithm that enables operation of the systems and methods as described herein. The caption tokens are vectorized though a word vectorizer to generate caption word vectors. The caption word vectors are converted, i.e., regenerated into caption sentence vectors through a term frequency inverse document frequency (TF-IDF) algorithm. The caption sentence vectors represent the entire sentence, i.e., the entire caption, and the vectors define the semantics of the caption. The caption sentence vectors are stored within a caption sentence vectors database that partially defines a sentence vectors domain within the image-word combined vector space. Accordingly, the caption sentence vectors are used for defining semantic relationships within the image-word combined vector space between other caption sentence vectors and the image vectors.

In at least some embodiments, the second data flow path uses textual data input to build the image-word combined vector space and train the model therein. In some embodiments, the second data flow path may be executed in parallel with the first data flow path. The second flow path is used to populate the combined vector space with textual content word vectors and textual content sentence vectors using textual content pulled from a variety of textual content sources. Accordingly, the second data flow path adds additional textual details associated with a subject or subjects related to the image data and the respective caption data.

In at least some embodiments, a textual input is received in the form of sentences that appear to at least have a reasonable relationship with the context of the images and captions captured as previously described. At least partially due to the potentially large volume of textual information associated with the subject of the images, the handling of the textual content in the second data flow will need to be different from those operations in the first data flow. For example, an automated context/relevance analyzer will not be implemented in the second data flow due to the practical considerations based on the volume. Initially, the textual content data may be obtained through any method that enables operation of the systems and methods described herein, including, without limitation, general searches through search engines and directed intake of the relevant contents of research corpuses. In at least some embodiments, the capture of textual content data is at least partially constrained at the point of intake. In some embodiments, the captured textual content that defines the textual content data set is permanently stored in a database, i.e., a corpus. In some other embodiments, due to the sheer volume of the textual material, the textual content data is temporarily maintained for a predetermined period of time. Accordingly, a textual content data set is captured for further analysis.

In at least one embodiment, the textual content data is pulled from the textual content data set as a stream of textual content words and the words are tokenized through a tokenizer, i.e., each word resident within a sentence in the data stream is tokenized into an individual textual content token. In a manner similar to that for the relevant captions previously described, the tokenizer is any algorithm that enables operation of the systems and methods as described herein. The textual content tokens are vectorized though a word vectorizer to generate textual content word vectors. The textual content word vectors are stored within a textual content word vectors database that partially defines a word vectors domain within the image-word combined vector space. Accordingly, the textual content word vectors are used for defining semantic relationships within the image-word combined vector space between other textual content word vectors, the caption sentence vectors, and the image vectors.

In at least some embodiments, in a parallel operation, the textual content word vectors are converted, i.e., regenerated into textual content sentence vectors through a term frequency inverse document frequency (TF-IDF) algorithm. The textual content sentence vectors represent the entire sentence as originally pulled from the textual content data set, and the vectors define the semantics of the sentence. The textual content sentence vectors are stored within a textual content sentence vectors database that partially defines a textual content sentence vectors domain within the image-word combined vector space. Accordingly, the textual content sentence vectors are used for defining semantic relationships within the image-word combined vector space between other textual content sentence vectors, the textual content word vectors, the caption sentence vectors, and the image vectors.

In one embodiment, word-word semantic relations are defined within the word vectors domain, image-image semantic relations are defined within the image vectors domain, and image-word semantic relations are defined between the word and image vector domains. These three relationships may be typically used to train small models for particular simple purposes. However, as described herein, these three relationships are further cross-related within the image-word combined vector space. Specifically, the sentence vectors, image vectors and word vectors are semantically correlated to define continuous semantic relationships therebetween within the N-dimensional image-text combined vector space. The continuous semantic relationships further approximates the functioning of the human brain through a deeper relationship between the semantics of the target subjects. For example, and without limitation, the continuous semantic relationships more closely mimics how well a human brain interprets an image of a dog. The enhanced human-level image sense identification through the enhanced vectorial relationships described herein may be further used to train other secondary models through unsupervised or semi-supervised methodologies, including, unsupervised or semi-supervised image classification without a predefined set of classes and unsupervised or semi-supervised word-based tagging of images with a new set of tags based on the respective image-word vector distances.

In at least embodiments, the formation of continuous semantic relationships as described herein may be implemented in an artificial intelligence (AI) platform, thereby taking advantage of AI training methodologies and mechanism to further enhance the generation of the continuous semantic relationships and leverage such relationships for secondary models also resident within the AI platform. For example, in general, the creation of the continuous semantic relationships is substantially unsupervised or semi-supervised, where the principle human intervention is the limiting of the image and textual input. Accordingly, the methods described herein define a generic model training methodology by which a base set of relationships is established within the N-vector space, that is then used to train, or retrain, other models, where the populated image-word combined vector space may be input into the other models with the images, words, and the respective semantic relationships, thereby decreasing time and effort to initially train or retrain a model.

As described herein, this disclosure describes generating vector embeddings of text (sentence and words) and images in the same vector space, while preserving the existing semantic relations between the words and images. In addition, the linguistic regularities associated with word-word linguistic relations, image-word linguistic relations, and image-image linguistic relations are preserved. Linguistic regularities, sometimes referred to as "linguistic laws" and "linguistic rules," are statistical regularities emerging across different linguistic scales (i.e., phonemes, syllables, words, and sentences) that can be formulated mathematically and that have been deduced from certain theoretical assumptions. Such linguistic regularities are also required to have been successfully tested through the use of data, that is, not to have been refuted by empirical evidence. One non-limiting example of image-word linguistic regularity includes a first relationship of a word vector associated with the word "king" and an image vector associated with an image of a queen being recognized as similar to a word vector associated with the word "man" and an image vector associated with an image of a woman.

Artificial Intelligence (AI) is one example of cognitive systems that relate to the field of computer science directed at computers and computer behavior as related to humans. Cognitive computing utilizes self-teaching algorithms that use data, visual recognition, and natural language processing (NLP) to solve problems and optimize human processes. The NLP features analyze the collected relevant materials as subject matter data as received from the sources as discussed herein. As the subject matter data is received, organized, and stored, the NLP features analyze the data to determine the relevant details through computational linguistics that provides parsing and semantic interpretation of the received text, which allows the associated systems to learn, analyze, and understand human language, including within the context of the present disclosure. With such an understanding, the AI can surface concepts, categories, sentiment, and emotion, and apply the acquired knowledge to extract the relevant portions of the received materials.

In addition, cognitive systems such as AI, based on information, are able to make decisions, which maximizes the chance of success in a given topic. More specifically, AI is able to learn from a data set to solve problems and provide relevant recommendations. For example, in the field of artificial intelligent computer systems, machine learning (ML) systems process large volumes of data, seemingly related or unrelated, where the ML systems may be trained with data derived from a database or corpus of knowledge. The ML systems look for, and determine, patterns, or lack thereof, in the data, "learn" from the patterns in the data, and ultimately accomplish tasks without being given specific instructions. In addition, the ML systems, utilizes algorithms, represented as machine processable models, to learn from the data and create foresights based on this data. More specifically, ML is the application of AI, such as, and without limitation, through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

ML learning systems may have different "learning styles." One such learning style is supervised learning, where the data is labeled to train the ML system through telling the ML system what the key characteristics of a thing are with respect to its features, and what that thing actually is. If the thing is an object or a condition, the training process is called classification. Supervised learning includes determining a difference between generated predictions of the classification labels and the actual labels, and then minimize that difference. If the thing is a number, the training process is called regression. Accordingly, supervised learning specializes in predicting the future.

A second learning style is unsupervised learning, where commonalities and patterns in the input data are determined by the ML system through little to no assistance by humans. Most unsupervised learning focuses on clustering, i.e., grouping the data by some set of characteristics or features. These may be the same features used in supervised learning, although unsupervised learning typically does not use labeled data. Accordingly, unsupervised learning may be used to find outliers and anomalies in a dataset, and cluster the data into several categories based on the discovered features.

Semi-supervised learning is a hybrid of supervised and unsupervised learning that includes using labeled as well as unlabeled data to perform certain learning tasks. Semi-supervised learning permits harnessing the large amounts of unlabeled data available in many use cases in combination with typically smaller sets of labelled data. Semi-supervised classification methods are particularly relevant to scenarios where labelled data is scarce. In those cases, it may be difficult to construct a reliable classifier through either supervised or unsupervised training. This situation occurs in application domains where labelled data is expensive or difficult obtain, like computer-aided diagnosis, drug discovery and part-of-speech tagging. If sufficient unlabeled data is available and under certain assumptions about the distribution of the data, the unlabeled data can help in the construction of a better classifier through classifying unlabeled data as accurately as possible based on the documents that are already labeled.

The third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments. Accordingly, over time, this behavior reinforcement facilitates determining the optimal behavior for a particular environment or situation.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

Referring to FIG. 1, a schematic diagram is provided illustrating a computer system 100, that in the embodiments described herein, is a machine-trained system 100 that is configured to train one or more models to facilitate management of word and image relationships in a combined vector space, and, more specifically, for establishing one or more continuous semantic relationships with word vectors, sentence vectors, and image vectors within the combined vector space. In at least one embodiment, the machine-trained system 100 is embodied as a cognitive system, i.e., an artificial intelligence (AI) platform computing system that includes an artificial intelligence platform 150 suitable for establishing one or more continuous semantic relationships with word vectors, sentence vectors, and image vectors within the combined vector space.

As shown, a server 110 is provided in communication with a plurality of computing devices 180, 182, 184, 186, 188, 190, and 192 across a computer network connection 105. The computer network connection 105 may include several information handling devices. Types of information handling devices that can utilize the machine-trained system 100 range from small handheld devices, such as a handheld computer/mobile telephone 180 to large mainframe systems, such as a mainframe computer 182. Examples of information handling systems includes, personal digital assistants (PDAs), personal entertainment devices, pen or tablet computer 184, laptop or notebook computer 186, personal computer system 188, server 190, and one or more Internet of Things (IoT) devices 192, that in at least some embodiments, include connected cameras. As shown, the various information handling systems can be networked together using the computer network connection 105.

Various types of a computer networks can be used to interconnect the various information handling systems, including Local Area Networks (LANs), Wireless Local Area Networks (WLANs), the Internet, the Public Switched Telephone Network (PSTN), other wireless networks, and any other network topology that can be used to interconnect information handling systems and computing devices as described herein. Many of the information handling systems include non-volatile data stores, such as hard drives and/or non-volatile memory. Some of the information handling systems may use separate non-volatile data stores, e.g., server 190 utilizes non-volatile data store 190a, and mainframe computer 182 utilizes non-volatile data store 182a. The non-volatile data store 182a can be a component that is external to the various information handling systems or can be internal to one of the information handling systems.

The server 110 is configured with a processing device 112 in communication with memory 116 across a bus 114. The server 110 is shown with the artificial intelligence (AI) platform 150 for cognitive computing, including machine learning, over the computer network connection 105 from one or more of the computing devices 180, 182, 184, 186, 188, 190, and 192. More specifically, the computing devices 180, 182, 184, 186, 188, 190, and 192 communicate with each other and with other devices or components via one or more wired and/or wireless data communication links, where each communication link may comprise one or more of wires, routers, switches, transmitters, receivers, or the like. In this networked arrangement, the server 110 and the computer network connection 105 enable communication, detection, recognition, and resolution. The server 110 is in operable communication with the computer network through communications links 102 and 104. Links 102 and 104 may be wired or wireless. Other embodiments of the server 110 may be used with components, systems, subsystems, and/or devices other than those that are depicted herein.

The AI platform 150 is shown herein configured with tools to enable one or more of deep learning techniques to generate models configured to establish patterns (both previously established and newly discovered by the AI platform 150) from unstructured data and one or more of the supervised learning techniques to make predictions. Moreover, the AI platform 150 is configured to use one or more of the unsupervised learning techniques to generate conclusions based on new information, and one or more of the semi-supervised learning techniques to use large amounts of unlabeled data available in combination with smaller sets of labelled data. In addition, in at least some embodiments, the AI platform 150 may receive reinforced learning through a manual review of video and other media inputs and tagging individuals or incidents that are not in compliance to at least partially close any learning gaps between an analysis of apparel being worn and the corpus used to train the AI platform 150 (as discussed further herein). The tools function to implement a methodology for training one or more models to facilitate management of word and image relationships in a combined vector space, and, more specifically, for establishing one or more continuous semantic relationships with word vectors, sentence vectors, and image vectors within the combined vector space.

The tools shown herein include, but are not limited to, an image manager 152, a natural language processing (NLP) manager 154, a caption manager 156, and a vector manager 158, where the image manager 152, the NLP manager 154, the caption manager 156, and the vector manager 158 include the machine learning (ML) features. The image manager 152, the NLP manager 154, the caption manager 156, and the vector manager 158 are described further herein with respect to FIGS. 2-3.

The AI platform 150 may receive input from the computer network connection 105 and leverage a knowledge base 170, also referred to herein as a corpus or data source, to selectively access training and other data. The knowledge base 170 is provided operably coupled to the server 110 including the processing device 112 and/or memory 116. In at least one embodiment, the knowledge base 170 may be operably coupled to the server 110 across the computer network connection 105. In at least one embodiment, the knowledge base 170 includes a library 172 that may be in the form of one or more databases. The library 172 includes different databases, including, but not limited to, an images database 173, an image vectors database 174, a captions database 175, a caption sentence vectors database 176, a textual content database 177, a textual content word vectors database 178, and a textual content sentence vectors database 179, where the databases 173-179 are described further herein. Accordingly, the server 110 including the AI platform 150, image manager 152, the NLP manager 154, the caption manager 156, and the vector manager 158 receive information from the computer network connection 105 and the devices connected thereto, and the knowledge base 170.

In at least some embodiments, the images database 173 includes the images collected by the image manager 152 from one or more image sources. In one or more embodiments, the stored images include all images collected, and in some other embodiments, the images in the image database 173 are only those images determined to be relevant. Also, in some embodiments, the image vectors database 174 includes the image vectors created by the image manager 152 from the images that are determined to be relevant, through determining the respective caption is relevant by the caption manager 156. Accordingly, the images used for operation of the AI platform 150 as described herein are maintained in the images database 173 and the image vectors database 174 is populated with the image vectors created from the relevant images in the images database 173.

In some embodiments, the captions database 175 includes the captions added by the captions manager 156 to each of the images collected from the one or more image sources. In one or more embodiments, the captions are respectively associated with the stored images and include all captions for all images collected, and in some other embodiments, the respective captions in the captions database 175 are only those captions for those captions and images determined to be relevant. Also, in some embodiments, the captions sentence vectors database 176 includes the captions sentence vectors created by the captions manager 156 from the captions that are determined to be relevant by the cations manager 156. Accordingly, the captions used for operation of the AI platform 150 as described herein are maintained in the captions database 175 and the caption sentence vectors database 176 is populated with the caption sentence vectors created from the relevant captions in the captions database 175.

Moreover, in at least some embodiments, the textual content database 177 includes each unit of textual content materials collected from one or more textual content sources, including, without limitation, the respective metadata for the textual content materials. The textual content word vectors database 178 is populated with the word vectors determined from the words of the textual content materials and the textual content sentence vectors database 179 is populated with sentence vectors determined through reconstitution of the associated sentences with the words of the textual content materials.

A response output 132 includes, for example, and without limitation, output generated in response to a query of the library 172 that may include some combination of image and textual output. Further details of the information displayed is described in FIG. 3.

In at least one embodiment, the response output 132 is communicated to a corresponding network device, shown herein as a visual display 130, operatively coupled to the server 110 or in at least one other embodiment, operatively coupled to one or more of the computing devices 180-192 across the computer network connection 105.

The computer network connection 105 may include local network connections and remote connections in various embodiments, such that the artificial intelligence platform 150 may operate in environments of any size, including local and global, e.g., the Internet. Additionally, the AI platform 150 serves as a front-end system that can make available a variety of knowledge extracted from or represented in network accessible sources and/or structured data sources. In this manner, some processes populate the AI platform 150, with the AI platform 150 also including one or more input interfaces or portals to receive requests and respond accordingly.

Figure 2:
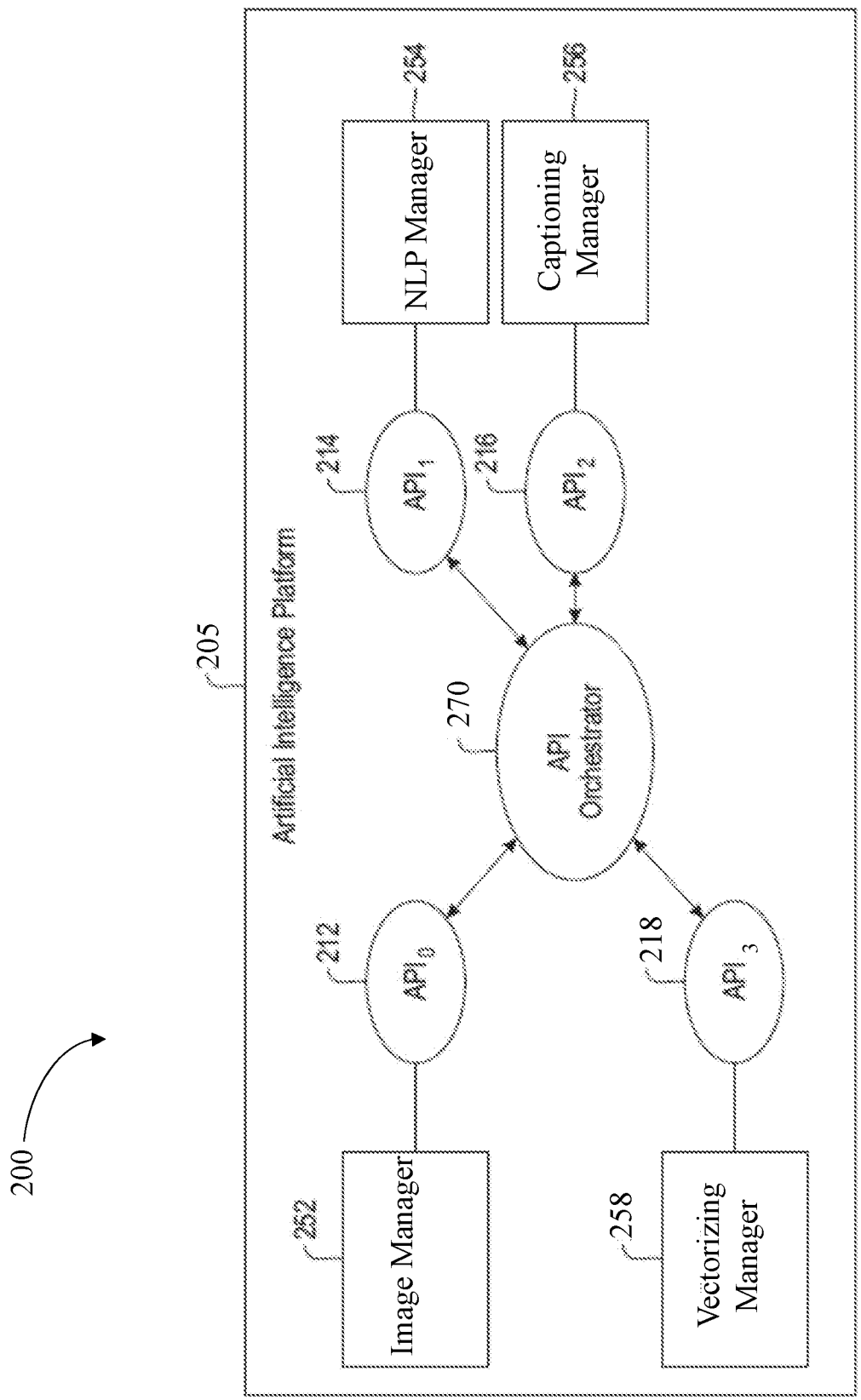
FIG. 2 is a block diagram illustrating artificial intelligence platform tools, as shown and described in FIG. 1, and their associated application program interfaces, in accordance with some embodiments of the present disclosure.

An Application Program Interface (API) is understood in the art as a software intermediary, e.g., invocation protocol, between two or more applications which may run on one or more computing environments. With respect to the AI platform 150 shown and described in FIG. 1, one or more APIs may be utilized to support one or more of the tools 152-158 and their associated functionality. Referring to FIG. 2, a block diagram 200 is provided illustrating the tools 252-258 and their associated APIs. As shown, a plurality of tools is embedded within the AI platform 205, that is equivalent to the AI platform 150 (shown in FIG. 1). The AI platform 205 includes the tools including, but not limited to, the image manager 152 (shown herein as 252) associated with $API_0$ 212, the NLP manager 154 (shown herein as 254) associated with $API_1$ 214, the caption manager 156 (shown herein as 256) associated with $API_2$ 216, and the vectorizing manager 158 (shown herein as 258) associated with $API_3$ 218.

Each of the APIs may be implemented in one or more languages and interface specifications. $API_0$ 212 provides functional support for, without limitation, the image manager 252 that is configured to facilitate execution of one or more operations by the server 110. Such operations include, without limitation, extracting a plurality of images from one or more image sources, and transmitting the images to populate the images database 173.

$API_1$ 214 provides functional support for, without limitation, the NLP manager 254 employing a natural language processing (NLP) engine (not shown) to facilitate execution of one or more operations by the server 110. Such operations include, without limitation, extracting at least a portion of textual content from one or more text data objects from one or more textual sources, where the extracted textual content includes a plurality of textual content words. The NLP manager 254 further transmits extracted textual content to populate the textual content database 177. In at least some embodiments, the NLP manager 254 also cooperates with the caption manager 156 as discussed further herein.

$API_2$ 216 provides functional support for, without limitation, the caption manager 256 to facilitate execution of one or more operations by the server 110. Such operations include, without limitation, assigning a caption to each image of the plurality of images, to generate the plurality of captioned images. In at least some embodiments, the captioned images are transmitted to the images database 173 by the image manager 252 and the captions are transmitted to the captions database 175 by the caption manager 256. In some embodiments, only captioned images are transmitted to the images database 173, i.e., due to data volume limitations, the raw image data is not stored. Also, the caption manager 256 facilitates filtering the captioned images, where the filtering operations include, without limitation, executing a contextual review of each captioned image, determining, subject to the contextual review, a contextual relevance of each captioned image, and comparing each respective contextual relevance determination with a relevance threshold. Subject to the comparison, those captioned images with a contextual relevance value that does not meet or exceed the relevance threshold value are removed, thereby generating a plurality of relevant images and a respective plurality of relevant captions, where the relevant images and relevant captions are transmitted by the image manager 252 and the caption manager 256, respectively, to the respective images database 173 and captions database 175. In some embodiments, the relevant and non-relevant images are stored in the images database 173 to maintain a history of the filtering operations with the non-relevant images and the associated contextual relevance values if they should be needed for future operations. Similarly, in some embodiments, the relevant and non-relevant captions are stored in the captions database 175 to maintain a history of the filtering operations with the non-relevant captions and the associated contextual relevance values if they should be needed for future operations. In some embodiments, only the relevant images and relevant captions are stored in the respective images database 173 and captions database 175. In some embodiments, the NLP manager 254 provides NLP support to the caption manager 256 to execute the captioning operations with verbiage that enables the operation of the machine-trained system 100 as further described herein. In addition, in some embodiments, the cooperation between the NLP manager 254 and the caption manager 256 facilitates the contextual relevance determinations.

$API_3$ 218 provides functional support for, without limitation, the vector manager 258 to facilitate execution of one or more operations by the server 110. In some embodiments, such operations include, without limitation, an image vectorizing tool, or application, resident within the vector manager 258 vectorizing each relevant image of the plurality of relevant images to generate the plurality of image vectors. In some embodiments, the image vectorizing application is code resident within any component that enables operation of the machine-trained system 100 as described herein, including, without limitation, the memory 116, and enabled through the processor 112. In such embodiments, the vector manager 258 continues to manage the image vectorizing processes. In some embodiments, the image vectorizing tool includes additional algorithms to enable a latent semantic analysis of the generated image vectors. The vector manager 258 also transmits the image vectors to the image vectors database 174. In at least some embodiments, the vector manager 258 facilitates at least partially defining an image-word combined vector space (shown in FIG. 3) with N-dimensional coordinates through defining an image vectors domain within the vector space with the plurality of image vectors that are resident within the image vectors database 174. In some embodiments, the image-word combined vector space is resident within the knowledge base 170. In some embodiments, the image-word combined vector space is resident within any component that enables operation of the machine-trained system 100 as described herein, including, without limitation, the non-volatile data stores $182_A$ and $190_A$.

In addition, within at least some embodiments, the vector manager 258 also includes a tokenizer tool, or application, resident therein that is configured to tokenize the relevant captions to generate a plurality of caption tokens. In some embodiments, the tokenizer application is code resident within any component that enables operation of the machine-trained system 100 as described herein, including, without limitation, the memory 116, and enabled through the processor 112. In such embodiments, the vector manager 258 continues to manage the word vectorizing processes.

Moreover, in at least some embodiments, the vector manager 258 includes a word-to-vector conversion tool that is configured to convert the caption tokens to caption word vectors, such tool including, without limitation, Word2vec, to generate the caption word vectors. In some embodiments, the Word2vec tool includes additional algorithms to enable a latent semantic analysis of the generated word vectors. Such semantic analysis includes determining one or more sentiments associated with the generated word vectors. In some embodiments, the word vectorizer tool is code resident within any component that enables operation of the machine-trained system 100 as described herein, including, without limitation, the memory 116, and enabled through the processor 112. In such embodiments, the vector manager 258 continues to manage the word vectorizing processes.

Further, in some embodiments, the vector manager 258 includes a word vector-to-sentence vector tool, or algorithm, that is any algorithm that enables operation of the machine-trained system 100 as described herein, including, without limitation, a term frequency inverse document frequency (TF-IDF) algorithm. In some embodiments, the TF-IDF algorithm includes additional algorithms to enable a latent semantic analysis of the generated sentence vectors. The semantic analysis includes determining one or more sentiments associated with the caption sentence vectors. In some embodiments, the TF-IDF algorithm is code resident within any component that enables operation of the machine-trained system 100 as described herein, including, without limitation, the memory 116, and enabled through the processor 112. In such embodiments, the vector manager 258 continues to manage the sentence vectorizing processes. Therefore, the TF-IDF algorithm is configured to generate the plurality of caption sentence vectors.

In addition, the vector manager 258 also transmits the caption sentence vectors to the caption sentence vectors database 176. In at least some embodiments, the vector manager 258 facilitates at least partially defining a sentence vectors domain within the image-word combined vector space with the plurality of caption sentence vectors that are resident within the caption sentence vectors database 176. Accordingly, the vector manager 258 facilitates generating, and positioning within the respective databases and the image-word combined vector space, the image vectors and the associated caption sentence vectors, where the stored caption sentence vectors have one or more semantic relationships with the respective portion of the image vectors, thereby defining one or more combined image-word semantic relationships.

In a manner similar to that for the caption sentences, within at least some embodiments, the vector manager 258 uses the tokenizer application to tokenize the textual content words from the textual content data set to generate a plurality of textual content tokens. The vector manager 258 also vectorizes each textual content word to generate a plurality of textual content word vectors. These textual content word vectors are converted to textual content sentence vectors through the TF-IDF algorithm where sematic relations between the word vectors and the sentence vectors are established. A semantic relations analysis includes determining one or more sentiments associated with the textual content word vectors and the textual content sentence vectors.

The textual content sentence vectors are transmitted to the textual content sentence vectors database 178 and populate the sentence vectors domain in the image-word combined vector space with the plurality of caption sentence vectors. In addition, the vector manager 258 also transmits the textual content word vectors to the textual content word vectors database 178. In at least some embodiments, the vector manager 258 facilitates at least partially defining a textual content word vectors domain within the image-word combined vector space.

Therefore, the vector manager 258 facilitates generating, and positioning within the respective databases and the image-word combined vector space, the textual content word vectors and the associated textual content sentence vectors, where the stored textual content word vectors have one or more semantic relationships with the respective portion of the textual content sentence vectors, thereby further defining the combined image-word semantic relationships. Furthermore, these additional combined image-word semantic relationships are extended through the image vectors and the caption sentence vectors to establish one or more continuous semantic relationships through the three domains of the N-dimensional image-word combined vector space.

Furthermore, the NLP manager 254 is configured to capture image-word linguistic regularities between the plurality of image vectors, the plurality of caption sentence vectors, the plurality of textual content word vectors, and the plurality of textual content sentence vectors.

As shown, each of the APIs 212, 214, 216, and 218 are operatively coupled to an API orchestrator 270, otherwise known as an orchestration layer, which is understood in the art to function as an abstraction layer to transparently thread together the separate APIs. In at least one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
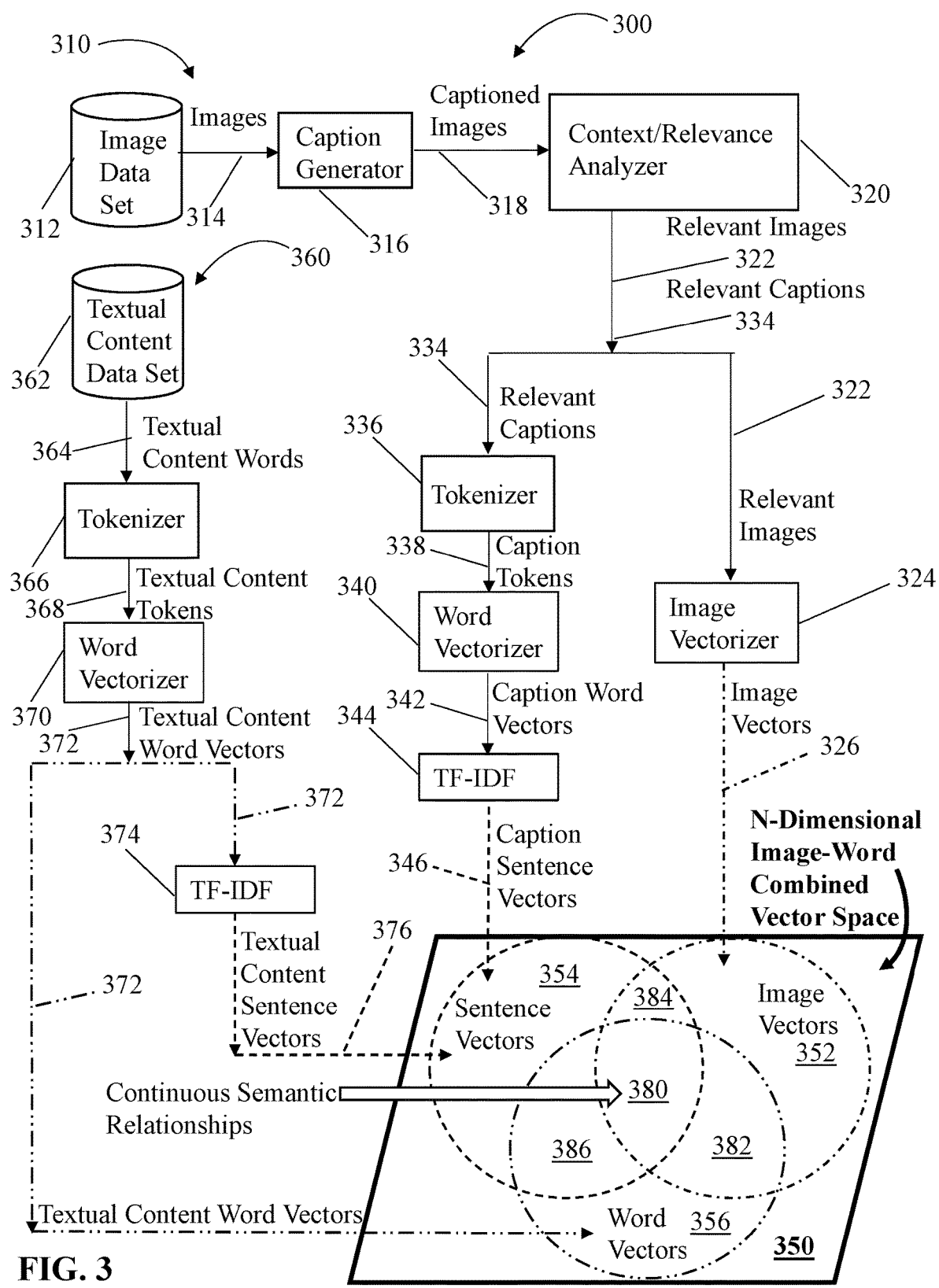
FIG. 3 is a flow chart illustrating a process for generating continuous semantic relationships with word vectors, sentence vectors, and image vectors within a combined vector space, in accordance with some embodiments of the present disclosure.

Referring to FIG. 3, a flow chart is provided illustrating a process 300 for generating continuous semantic relationships with word vectors, sentence vectors, and image vectors within a combined vector space. In at least some embodiments, the process 300 includes two data flow paths, i.e., a first, or image, data flow path 310 and a second, or textual content flow path 360. In some embodiments, the image data flow path 310 and the textual content flow path 360 may be performed in parallel. In some embodiments, the image data flow path 310 and the textual content flow path 360 may be performed in series.

In at least some embodiments, referring to FIGS. 1-3, a captured image data set 312 is generated through extracting a plurality of images 314 from one or more image sources (not shown). The sources may include, without limitation, any source available through the computing devices 180-192 across the computer network connection 105, including free and licensed images, scanned images not generally available to the public, and images captured through a camera within one or more of the IoT devices 192. The extracted images 314 within the captured image data set 312 are transmitted to populate the images database 173. Accordingly, the image manager 152 manages the extraction of a plurality of images 314 and transmission of the images 314 to populate the images database 173.

In one or more embodiments, the images 314 are transmitted to a caption generator 316. The caption manager 156 generates a caption for each of the images 314 through the caption generator 316. Specifically, the images 314 receive a caption generated by the caption generator 316 through one or more captioning algorithms including, without limitation, a convolutional neural network (CNN) and a long short term memory (LSTM) network, thereby generating a plurality of captioned images 318. The CNN is a class of deep neural networks commonly applied to analyzing visual imagery through simulating vision processing in living organisms. The CNN uses a neural network that includes input, output, and hidden layers, where the hidden layers include, without limitation, convolution and pooling layers, to extract features from the images 314. The LSTM network is also a class of deep neural networks commonly used to recognize patterns in data. The LSTM network is a recurrent neural network (RNN) that receives the output of the CNN and generates the respective captions based on the extracted features from the respective image, where the captions have a specific sequence of words therein. In some embodiments, the CNN and LSTM network are combined into a machine learning unit, e.g., a CNN-LSTM encoder. The captions are generated with substantial accuracy directed toward the feature, or features, in the images 314. The captions are stored in a captions database 175 by the caption manager 156. In some embodiments, the NLP manager 154 provides NLP support to the caption manager 156 to execute the captioning operations with verbiage that enables the operation of the machine-trained system 100 as described herein. Accordingly, the caption manager 156 manages the assignment of captions to each of the images 314 to generate the captioned images 318.

In at least some embodiments, the captioned images 318 are analyzed for their contextual content and the relevance of the contextual content is determined by the caption manager 156 through a context/relevance analyzer 320. In some embodiments, only the context of the captions is analyzed, since the features of the images were used to generate the captions in the caption generator 316. In some embodiments, the captions for the respective captioned images 318 are transmitted to the captions database 175. The context/relevance analyzer 320 provides a filtering effect on the captioned images 318. Accordingly, the filtering of the captioned images 318 includes executing a contextual review of each captioned image 318 through analyzing the respective captions.

Subject to the contextual review, a contextual relevance value of each captioned image 318 is determined by the context/relevance analyzer 320. The contextual relevance value is compared with a predetermined relevance threshold value. In some embodiments, the relevance threshold value is established based on one or more of, without limitation, the volume of captioned images 318 and the subject of the captioned images 318. Those captioned images 318 that have a contextual relevance value that equals or exceeds the relevance threshold value are allowed to proceed through the remainder of the image data flow path 310. Those captioned images 318 that have a contextual relevance value that is less than the relevance threshold value are removed. Accordingly, the caption manager 156, through the context/relevance analyzer 320, generates a plurality of relevant images 322 with a respective plurality of relevant captions 334 that have been filtered from the captioned images 318.

In some embodiments, the NLP manager 154 provides NLP support to the context/relevance analyzer 320 to execute the contextual relevance operations with NLP features that enable the operation of the machine-trained system 100 as further described herein. Therefore, in some embodiments, the cooperation between the NLP manager 154 and the caption manager 156 facilitates the contextual relevance determinations.

In at least one non-limiting embodiment, a real estate professional may be interested in comparing real estate holdings with particular geographical features, e.g., lakes, with real estate holdings with other geographic features, e.g., woods. In such an embodiment, the images 314 of real estate including lakes and real estate including woods are searched for, located, and captured in the image data set 312. The lake and woods images 314 are captioned by the caption generator 316 such that a first subset of the captioned images 318 of real estate with lakes may be captioned as "real estate with lakes" and a second subset of captioned images 318 of real estate with woods may be captioned as "real estate with woods." Also, in such an embodiment, the captioned images 318 of both subsets are further processed through the context/relevance analyzer 320 where the filtering features distinguish between the captioned images with woods from the captioned images with lakes. In some embodiments, the images of either subset may be blocked from further analyses within the image data flow path 310 based on the filtering mechanisms of the context/relevance analyzer 320 to facilitate reducing unnecessary downstream processing and to facilitate maintaining the relevance of the stored data. In some embodiments, the two subsets of captioned images are merely distinguished from each other as both subsets proceed through further processing within the image data flow path 310.

In one or more embodiments, the capturing of the image data set 312 uses unsupervised learning techniques and the potential for a real estate image without either a lake or woods may be captured. In the event that any real estate images without either woods or lakes were allowed to enter the stream of caption images 318, the context/relevance analyzer 320 will filter out such images since the caption generator 316 will caption the images 314 with captions that do not include the terms "lake" and "woods." In at least some embodiments, the contextual interpretation of the captioning is semi-supervised in that the unlabeled data used to analyze the captioned images 318 for relevance may far outweigh the labeled data. Accordingly, a contextual review of the captioned images 318 to determine a contextual relevance of the image is applied, where the captioned images 318 may be filtered based on the respective contextual relevance, and unrelated images can be removed prior to further analysis.

As discussed herein, the relevant images 322 are transmitted by the image manager 152 to the images database 173, and the relevant captions 324 are transmitted by the caption manager 156 to the captions database 175. In some embodiments, where data storage limitations exist, only relevant images 322 are transmitted to the images database 173, and only relevant captions 324 are transmitted to the captions database 175. In addition to the relevant images 322 and relevant captions 324, in some embodiments, all of the captured images 314 from the raw data in the image data set 312, including the captioned images 318, and the respective captions, are transmitted to their respective images database 173 and captions database 175. Therefore, in some embodiments, the relevant images 322 and non-relevant images are stored in the images database 173 to maintain a history of the filtering operations with the non-relevant images and the associated contextual relevance values if they should be needed for future operations. Similarly, in some embodiments, the relevant and non-relevant captions are stored in the captions database 175 to maintain a history of the filtering operations with the non-relevant captions and the associated contextual relevance values if they should be needed for future operations.

In one or more embodiments, the relevant images 322 are vectorized by the vector manager 158 through an image vectorizer tool, or algorithm 324 to generate image vectors 326. The image vectors 326 are stored in the image vectors database 174 by the vector manager 158. In some embodiments, the image vectorizing application 324 is code resident within any component that enables operation of the machine-trained system 100 as described herein, including, without limitation, the memory 116, and enabled through the processor 112. In such embodiments, the vector manager 158 continues to manage the image vectorizing processes. In some embodiments, the image vectorizing tool includes additional algorithms to enable a latent semantic analysis of the generated image vectors.

In at least some embodiments, the vector manager 158 facilitates at least partially defining an image-word combined vector space 350 with N-dimensional coordinates through defining an image vectors domain 352 within the vector space 350 with the plurality of image vectors 326 that are resident within the image vectors database 174. In some embodiments, the image-word combined vector space 350 is resident within the knowledge base 170. In some embodiments, the image-word combined vector space 350 is resident within any component that enables operation of the machine-trained system 100 as described herein, including, without limitation, the non-volatile data stores $182_A$ and $190_A$. Accordingly, the image vectors 326 physically populate the image vectors database 174 and virtually populate the image vectors domain 352 in the image-word combined vector space 350.

In some embodiments, the image data flow path 310 also includes further analyses of the relevant captions 334. In at least one embodiment the relevant captions 334 are tokenized by the vector manager 158 through a tokenizer 336, i.e., each word in the relevant caption 334 is tokenized into an individual caption token 338. The tokenizer 336 is any algorithm that enables operation of the machine-trained system 100 as described herein. In some embodiments, the tokenizer 336 is code resident within any component that enables operation of the machine-trained system 100 as described herein, including, without limitation, the memory 116, and enabled through the processor 112. In such embodiments, the vector manager 158 continues to manage the caption vectorizing processes. Accordingly, each word of the relevant captions 334 is converted into a caption token 338 by the tokenizer 336.

Moreover, in at least some embodiments, the caption tokens 338 are vectorized by the vector manager 158 through a word vectorizer 340 to generate a plurality of caption word vectors 342. In at least one embodiment, the word vectorizer 340 is a word-to-vector conversion tool that is configured to convert the caption tokens 338 to caption word vectors 342. In some embodiments, the word vectorizer 340 is, without limitation, Word2vec. In some embodiments, the word vectorizer 340 includes additional algorithms to enable a latent semantic analysis of the generated caption word vectors 342. Such semantic analysis includes determining one or more sentiments associated with the caption word vectors 342. In some embodiments, the word vectorizer 340 is code resident within any component that enables operation of the machine-trained system 100 as described herein, including, without limitation, the memory 116, and enabled through the processor 112. In such embodiments, the vector manager 158 continues to manage the word vectorizing processes. Accordingly, the caption tokens 338 are converted into caption word vectors by the word vectorizer 340.

Further, in some embodiments, the caption word vectors 342 are converted, i.e., regenerated into caption sentence vectors 346 by the vector manager 158 through a word vector-to-sentence vector tool, or algorithm, that is any algorithm that enables operation of the machine-trained system 100 as described herein, including, without limitation, a term frequency inverse document frequency (TF-IDF) algorithm 344. The caption word vectors 342 are input to the TF-IDF algorithm 344, and IDF frequencies are computed from prior training documents, thereby creating the caption sentence vectors 346. Specifically, a caption word vector 342 is given a numerical statistic, e.g., a weighted average that is intended to reflect how important a word is to a caption or a document in a broader collection or corpus. The TF-IDF values increases proportionally with the number of times a word appears in the caption, sentence, or document and is offset by the number of captions, sentences, and documents in the corpus that contain the word, which helps to adjust for the fact that some words appear more frequently in general. The caption word vectors 342 in the caption are added to make the respective caption sentence vector 346. In some embodiments, the TF-IDF algorithm 344 includes additional algorithms to enable a latent semantic analysis of the generated sentence vectors 346. The semantic analysis includes determining one or more sentiments associated with the caption sentence vectors 346. In some embodiments, the TF-IDF algorithm 344 is code resident within any component that enables operation of the machine-trained system 100 as described herein, including, without limitation, the memory 116, and enabled through the processor 112. In such embodiments, the vector manager 158 continues to manage the sentence vectorizing processes. Accordingly, the caption sentence vectors 346 represent the entire sentence, i.e., the entire caption, and the caption sentence vectors 346 define the semantics of the respective caption.

In addition, the vector manager 158 also transmits the caption sentence vectors 346 to the caption sentence vectors database 176. In at least some embodiments, the vector manager 158 facilitates at least partially defining a sentence vectors domain 354 within the image-word combined vector space 350 with the plurality of caption sentence vectors 346 that are resident within the caption sentence vectors database 176. Accordingly, the caption sentence vectors 346 physically populate the caption sentence vectors database 176 and virtually populate the sentence vectors domain 354 in the image-word combined vector space 350.

In addition, the vector manager 158 facilitates generating, and positioning within the respective image vectors and caption sentence vectors databases 174 and 176, respectively, and the respective image vectors and sentence vectors domains 352 and 354, respectively, the image vectors 326 and the associated caption sentence vectors 346. The stored caption sentence vectors 346 have one or more semantic relationships with the respective portion of the image vectors 326, thereby defining one or more combined image-word semantic relationships. Accordingly, the caption sentence vectors 346 are used for defining semantic relationships within the image-word combined vector space 350 between other caption sentence vectors 346 and the image vectors 326.

In at least some embodiments, the second data flow path 360 uses textual data input to build the image-word combined vector space 350 and train the model therein. In some embodiments, the second data flow path 360 may be executed in parallel with the first data flow path 310. Specifically, in at least some embodiments, and continuing to refer to FIGS. 1-3, a captured textual content data set 362 is generated through extracting a plurality of text documents (not shown) from one or more text document sources (not shown) through the computing devices 180-192 across the computer network connection 105, including free and licensed text documents, or documents not generally available to the public.

In at least some embodiments, the textual inputs are received in the form of sentences that appear to at least have a reasonable relationship with the context of the images and captions captured as previously described. At least partially due to the potentially large volume of textual information associated with the subject of the images, the handling of the textual content in the second data flow path 360 will need to be different from those operations in the first data flow path 310. For example, an automated context/relevance analyzer 320 will not be implemented in the second data flow path 360 due to the practical considerations based on the volume. Initially, the textual content data set 362 may be obtained through any method that enables operation of the systems and methods described herein, including, without limitation, general searches through search engines and directed intake of the relevant contents of research corpuses. In at least some embodiments, the capture of the textual content data set 362 is at least partially constrained at the point of intake through supervised or semi-supervised learning techniques. In some embodiments, the captured textual content that defines the textual content data set 362 is permanently stored in a database, i.e., a corpus, e.g., the textual content database 177 in the knowledge base 170. In some other embodiments, due to the sheer volume of the textual material, at least a portion of the textual content data is only temporarily maintained within the textual content database 177 for a predetermined period of time. Accordingly, a textual content data set 362 is captured for further analysis. Accordingly, the NLP manager 154 manages the extraction of the textual content data set 362 and transmission of the textual content data set 362 to populate the textual content database 177.

In one or more embodiments, to facilitate the textual content capturing operation, the machine-trained system 100 employs natural language processing (NLP) to facilitate the capture of the textual content data set 362 through the NLP manager 154. The NLP features embedded within the NLP manager 154 analyze the collected relevant textual materials as they are received from the sources as discussed herein. As the textual content data is received, organized, and stored, the NLP features within the NLP manager 154 analyze the captured textual content data to determine the relevant details through computational linguistics that provides parsing and semantic interpretation of the received text, which allows the NLP manager 154 to learn, analyze, and understand the human language associated with relevant subject matter in the captured textual content. With such an understanding, the NLP manager 154 will apply the acquired knowledge to extract the relevant portions of the received materials. Accordingly, the NLP manager 154 manages the intake of the textual content data set 362.

In at least one embodiment, the NLP manager 154 manages all aspects of the intake of the relevant materials into the textual content data set 362. In some embodiments, the intake is unsupervised or semi-supervised. In some embodiments, the materials intake is at least partially facilitated by human assistance to identify the sources of the materials and the materials themselves to initiate the training of the model within the AI platform 150. The NLP manager 154 ingests and analyzes written material relevant to the determined subject, e.g., the previously discussed real estate with lakes and woods in the form of, for example, and without limitation, real estate listings, accessible imaging applications, satellite images, and property assessments. Accordingly, a large volume of respective published materials in the form of the textual content data set 362 are ingested, analyzed, considered, and are loaded into the textual content database 177 within the knowledge base 170.

In at least one embodiment, the contents of the textual content data set 362 are pulled as a stream of textual content words 364 that are tokenized through a tokenizer 366, i.e., each word resident within the stream of textual content words 364 is tokenized into an individual textual content token 368. In a manner similar to that for the relevant captions 334 and the respective tokenizer 336 previously described, the tokenizer 366 is any algorithm that enables operation of the machine-trained system 100 as described herein. Accordingly, each word of the textual content words 364 is converted into a textual content token 368 by the tokenizer 366.

Moreover, in at least some embodiments, the textual content tokens 388 are vectorized by the vector manager 158 through a word vectorizer 370 to generate a plurality of textual content word vectors 372. In at least one embodiment, the word vectorizer 370 is a word-to-vector conversion tool that is configured to convert the textual content word vectors 372 to the textual content word vectors 372. In some embodiments, the word vectorizer 370 is, without limitation, Word2vec. In some embodiments, the word vectorizer 370 includes additional algorithms to enable a latent semantic analysis of the generated textual content word vectors 372. Such semantic analysis includes determining one or more sentiments associated with the textual content word vectors 372. In a manner similar to that for the caption tokens 338 and the respective word vectorizer 340 previously described, the word vectorizer 370 is any algorithm that enables operation of the machine-trained system 100 as described herein. Accordingly, the textual content word vectors 372 are used for defining semantic relationships within the image-word combined vector space 350 between other textual content word vectors 372, the caption sentence vectors 346, and the image vectors 326.

In addition, the vector manager 158 also transmits the textual content word vectors 372 to the textual content word vectors database 178. In at least some embodiments, the vector manager 158 facilitates at least partially defining a word vectors domain 356 within the image-word combined vector space 350 with the plurality of textual content word vectors 372 that are resident within the content word vectors database 177. Accordingly, the textual content word vectors 372 physically populate the textual content word vectors database 177 and virtually populate the word vectors domain 356 in the image-word combined vector space 350.

Further, in some embodiments, the textual content word vectors 372 are converted, i.e., regenerated into textual content sentence vectors 376 by the vector manager 158 through a word vector-to-sentence vector tool, or algorithm, that is any algorithm that enables operation of the machine-trained system 100 as described herein, including, without limitation, a TF-IDF algorithm 374 similar to the TF-IDF algorithm 344. In addition, the vector manager 158 transmits the textual content sentence vectors 376 to the textual content sentence vectors database 179. Accordingly, the textual content sentence vectors 376 represent the entire respective sentence of the textual content data set 362 and the textual content sentence vectors 376 define the semantics of the respective portions of the textual content data set 362.

Further, accordingly, the second flow path 360 is used to populate the image-word combined vector space 350 with textual content word vectors 372 and textual content sentence vectors 376 using textual content pulled from a variety of textual content sources. Accordingly, the second data flow path 360 adds additional textual details associated with a subject or subjects related to the image data and the respective caption data. Moreover, accordingly, the textual content sentence vectors 376 are used for defining semantic relationships within the image-word combined vector space 350 between other textual content sentence vectors 376, the textual content word vectors 372, the caption sentence vectors 346, and the image vectors 326.

As shown in FIG. 3, the image vectors domain 352, the sentence vectors domain 354, and the word vectors domain 356 overlap with respect to the semantic relationships of the respective image vectors 326, the caption sentence vectors 346, the textual content sentence vectors 376, and the textual content word vectors 372. Specifically, one or more continuous sematic relationships 380 are established through the intersection of the image vectors domain 352, the sentence vectors domain 354, and the word vectors domain 356. As described herein, word-word semantic relations are defined within the word vectors domain 356, image-image semantic relations are defined within the image vectors domain 352, and sentence-sentence semantic relations are defined in the sentence vectors domain 354. In addition, image-word semantic relationships are defined between the overlap 382 between the image vectors domain 352 and the word vectors domain 356. Furthermore, the image-word semantic relationships are further defined through the overlap 384 between the image vectors domain 352 and the sentence vectors domain 354, and the overlap 386 between the sentence vectors domain 354 and the word vectors domain 356. Accordingly, the machine-trained system 100 described herein defines a continuous image-word semantic relationships 380 between the established word-word, image-image, and image-word sematic relationships.

Returning to the embodiment where one set of images of real estate may be captioned as "real estate with lakes" and a second set of real estate images may be captioned as "real estate with woods," the image vectors domain 352 include image vectors 326 based on the first and second sets of images. The image vectors 326 define a sematic relationship between the associated "real estate" features of the two sets of images. However, no semantic relationship is established between the "lake" and "woods" features, therefore an initial distinguishment of the images is established. The caption sentence vectors 346 resident within the sentence vectors domain 354 that include the semantic relationships between the captions "real estate with lakes" and "real estate with woods" extrapolate the semantic relationships of the caption sentence vectors 346 with the respective semantic relationships of the image vectors 326 as shown as overlap 384. Accordingly, any models generated through the AI platform 150 will have a semantic relationship between images of real estate, where images of real estate with woods and lakes are distinguished from one another.

The textual content word vectors 372 resident within the word vectors domain 356, and the textual content sentence vectors 376 resident within the sentence vectors domain 354 provide further enrichment of the semantic relationships between the images of real estate while providing further distinguishment of real estate with woods and lakes. For example, a first set of documents describing real estate with lakes and a second set of documents describing real estate with woods will enhance the semantic relationships associated with the "real estate" features and also enhance the distinguishment between real estate with lakes and real estate with woods based on the enhanced descriptions of each. Therefore, this embodiment, the semantic relationships between the various real estate properties are reflected in the overlaps 382, 384, and 386 that define the continuous sematic relationships between the words (including the sentences) and the images of real estate. Furthermore, for those distinguishing semantic relationships between lakes and woods, one of lakes and woods will be represented within the overlaps 382, 384, and 386 while the other will be outside the overlaps 382, 384, and 386. Therefore, a model trained through the mechanisms described herein will recognize real estate, lakes, and woods and will distinguish the differences between the real estate with woods and real estate with lakes.

The images and words associated with the label of "real estate with lakes" define a primary relationship therebetween. Similarly, images and words associated with the label of "real estate with woods" defines a primary relationship therebetween. In addition, the two labels define secondary relationships of "real estate," "lakes," and "woods." The tertiary relationships established between images and words associated with "real estate," "lakes," and "woods" may be defined through a label of "inanimate objects." Images and words directed towards dogs and cats may be defined through a label of "animate objects." In most situations, there is no real relationship between images and words directed toward inanimate objects and those directed toward animate objects. Therefore, in the image-word combined vector space 350, if there is an abundance of images associated with real estate with lakes, however there is a deficit of words associated with real estate with lakes, replacing an image of real estate with a lake with a textual description of real estate with a lake, the tertiary relationship between inanimate and animate objects will not change and the trained model will distinguish appropriately.

In addition, the system, computer program product, and method as disclosed herein extrapolates the semantic relationships to those classes that are not predefined, but related. For example, similar relationships as those previously discussed are extrapolated to define a sematic relationship between real estate with a pool and the other categories of real estate while distinguishing between real estate with pools, woods, and lakes, as well as cats and dogs. Accordingly, rather than merely representing images as a set of objects, the images reflect the overall context similar to that experienced by human senses. The continuous semantic relationships further approximate the functioning of the human brain through a deeper relationship between the semantics of the target subjects.

Therefore, the embodiments disclosed herein provide an improvement to computer technology. For example, the enhanced human-level image sense identification through the enhanced vectorial relationships described herein may be further used to train other smaller, secondary, and/or specialized models through supervised or semi-supervised methodologies. Specifically, such methodologies include unsupervised or semi-supervised image classification without a predefined set of classes and unsupervised or semi-supervised word-based tagging of images with a new set of tags based on the respective image-word vector distances.

In addition, at least some of the embodiments described herein use two distinct data flow paths 310 and 360 to populate the image-word combined vector space 350. The independent data flow paths 310 and 360 facilitate inputting captioned image data and textual data from varying sources. Foer example, the contextual features of the image data is captured and used to at least partially train the model and build the semantic relationships as described herein. Also, for example, the breaking-down of textual content in the form of sentences into word vectors and rebuilding the sentences with the word vectors establishes further semantic features into the image-text combined vectors space 350.

Furthermore, as described herein, in addition to generating vector embeddings of text (sentence and words) and images in the same vector space, while preserving the existing semantic relations between the words and images, the linguistic regularities associated with word-word linguistic relations, image-word linguistic relations, and image-image linguistic relations are preserved.

Accordingly, models as described herein developed using a continuous sematic relationship between a wide variety of image vectors, word vectors, and sentence vectors may be used as a launching point for leveraging the simulated human-level image sense identification, where those associated image vectors may be further used to train models using one or more of unsupervised or semi-supervised model training techniques. The improvement to computer technology is manifested in a practical technical application of the continuous semantic relationships to train models in lieu of known labor- and time-intensive supervised training methodologies.

Figure 4:
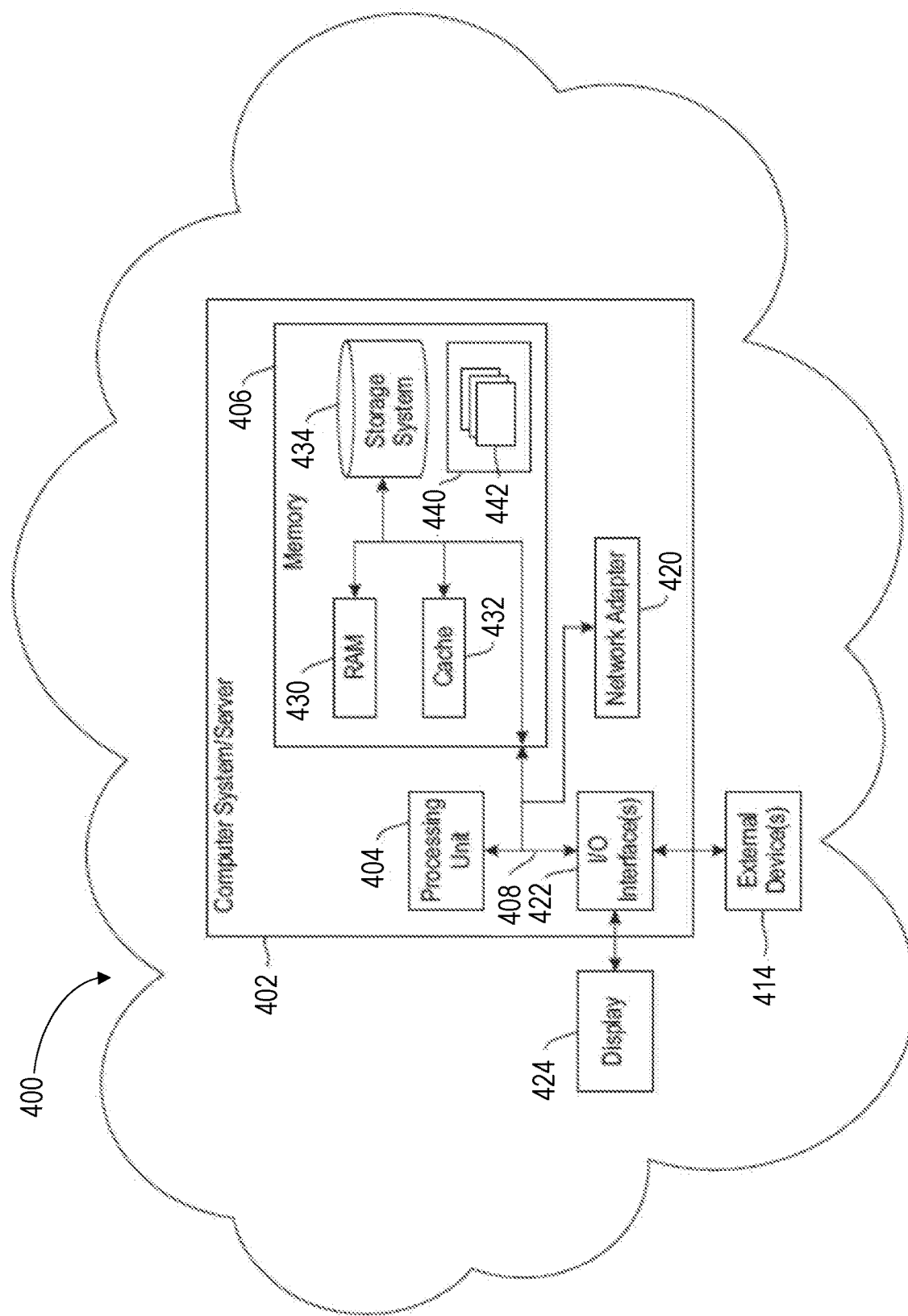
FIG. 4 is a block diagram illustrating a computer system/ server of a cloud-based support system, to implement the processes described above with respect to FIGS. 1-3, in accordance with some embodiments of the present disclosure.

Aspects of the computer system 100, i.e., machine-trained system 100 may be embodied in a computer system/server in a single location, or in at least one embodiment, may be configured in a cloud-based system sharing computing resources. With reference to FIG. 4, a block diagram is provided illustrating an example of a computer system 400 including a computer/server 402, hereinafter referred to as a host 402 in communication with a cloud-based support system, to implement the system, tools, and processes described above with respect to FIGS. 1-3. Host 402 is operational with numerous other general purpose or special purpose computer system environments or configurations. Examples of well-known computer systems, environments, and/or configurations that may be suitable for use with host 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 402 may be described in the general context of computer system-executable instructions, such as program modules, being executed by a computer system. Generally, program modules may include routines, programs, objects, components, logic, data structures, and so on that perform particular tasks or implement particular abstract data types. Host 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, host 402 is shown in the form of a general-purpose computing device. The components of host 402 may include, but are not limited to, one or more processors or processing devices or units 404, e.g. hardware processors, a system memory 406, and a bus 408 that couples various system components including system memory 406 to processing device 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 402 typically includes a variety of computer system readable media. Such media may be any available media that is accessible by host 402 and it includes both volatile and non-volatile media, removable and non-removable media.

Memory 406 can include computer system readable media in the form of volatile memory, such as random access memory (RAM) 430 and/or cache memory 432. By way of example only, a storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces.

Program/utility 440, having a set (at least one) of program modules 442, may be stored in memory 406 by way of example, and not limitation, as well as an operating system, one or more application programs, other program modules, and program data. Each of the operating systems, one or more application programs, other program modules, and program data or some combination thereof, may include an implementation of a networking environment. Program modules 442 generally carry out the functions and/or methodologies of embodiments as described in FIGS. 1-3.

Host 402 may also communicate with one or more external devices 414, such as a keyboard, a pointing device, etc.; a display 424; one or more devices that enable a user to interact with host 402; and/or any devices (e.g., network card, modem, etc.) that enable host 402 to communicate with one or more other computing devices. Such communication can occur via Input/Output (I/O) interface(s) 422. Still yet, host 402 can communicate with one or more networks such as a local area network (LAN), a general wide area network (WAN), and/or a public network (e.g., the Internet) via network adapter 420. As depicted, network adapter 420 communicates with the other components of host 402 via bus 408. In at least one embodiment, a plurality of nodes of a distributed file system (not shown) is in communication with the host 402 via the I/O interface 422 or via the network adapter 420. It should be understood that although not shown, other hardware and/or software components could be used in conjunction with host 402. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 406, including RAM 430, cache memory 432, and storage system 434, such as a removable storage drive and a hard disk installed in a hard disk drive.

Computer programs (also called computer control logic) are stored in memory 406. Computer programs may also be received via a communication interface, such as network adapter 420. Such computer programs, when run, enable the computer system to perform the features of the present embodiments as discussed herein. In particular, the computer programs, when run, enable the processing device 404 to perform the features of the computer system 400. As such, computer programs may represent controllers of the computer system 400.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In at least one embodiment, host 402 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a state of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
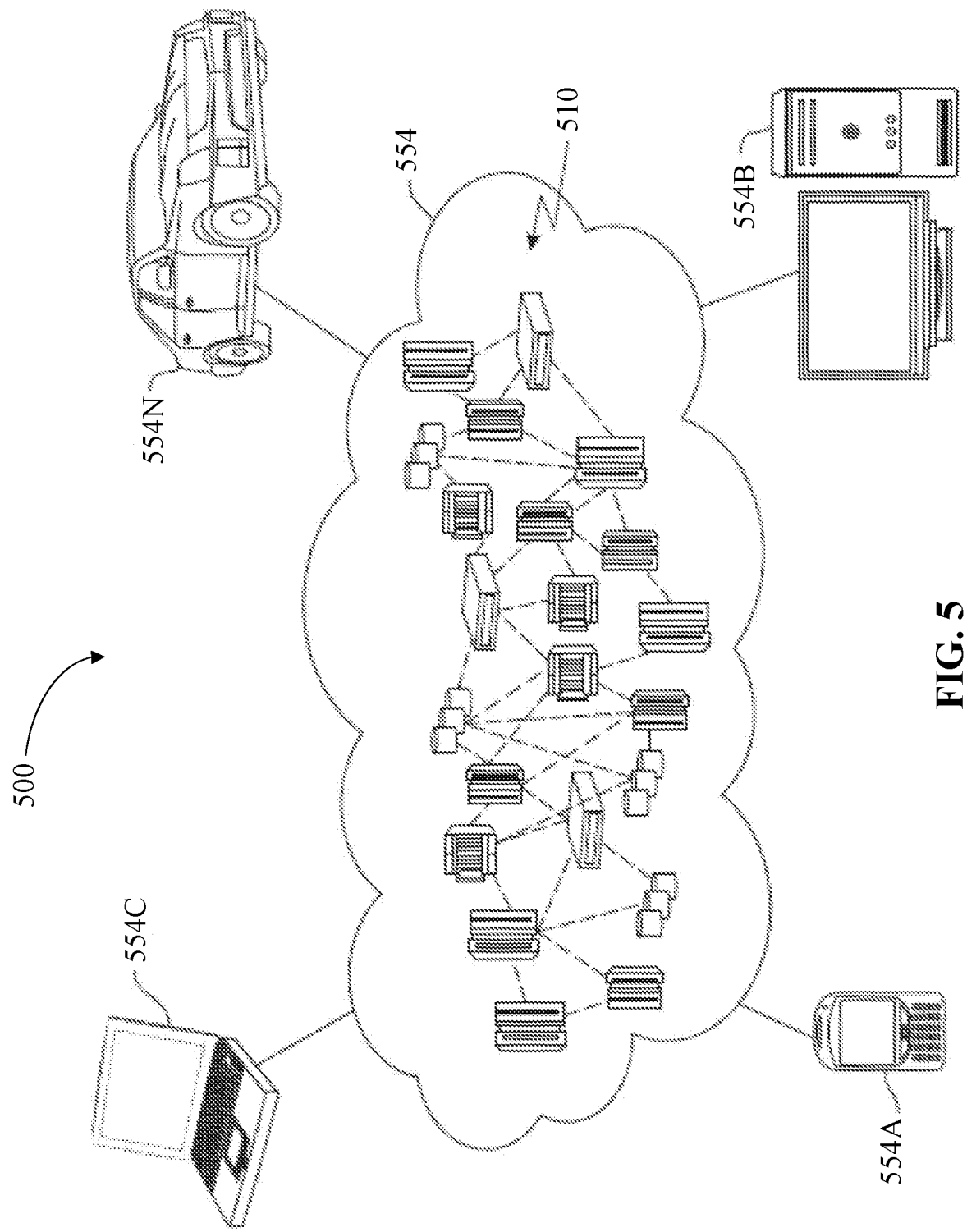
FIG. 5 is a schematic diagram illustrating a cloud computer environment, in accordance with some embodiments of the present disclosure.

Referring now to FIG. 5, a schematic diagram is provided illustrating an example cloud computing network 500. As shown, cloud computing network 500 includes a cloud computing environment 550 having one or more cloud computing nodes 510 with which local computing devices used by cloud consumers may communicate. Examples of these local computing devices include, but are not limited to, personal digital assistant (PDA) or cellular telephone 554A, desktop computer 554B, laptop computer 554C, and/or automobile computer system 554N. Individual nodes within nodes 510 may further communicate with one another. They may be grouped (not shown) physically or virtually, in one or more networks, such as Private, Community, Public, or Hybrid clouds as described hereinabove, or a combination thereof. This allows the cloud computing network 500 to offer infrastructure, platforms and/or software as services for which a cloud consumer does not need to maintain resources on a local computing device. It is understood that the types of computing devices 554A-N shown in FIG. 5 are intended to be illustrative only and that the cloud computing environment 550 can communicate with any type of computerized device over any type of network and/or network addressable connection (e.g., using a web browser).

Figure 6:
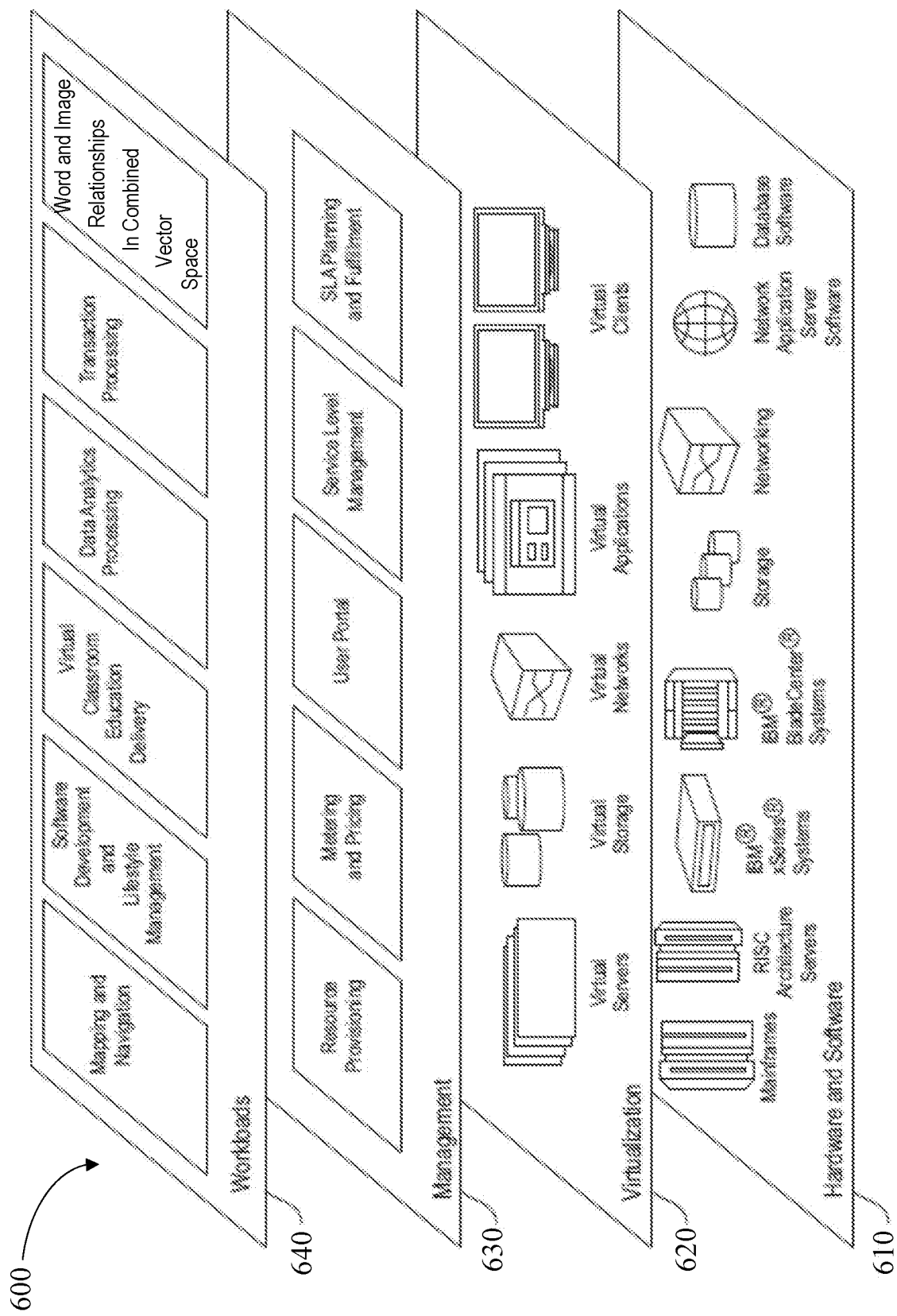
FIG. 6 is a block diagram illustrating a set of functional abstraction model layers provided by the cloud computing environment, in accordance with some embodiments of the present disclosure.

Referring now to FIG. 6, a set of functional abstraction layers 600 provided by the cloud computing network of FIG. 6 is shown. It should be understood in advance that the components, layers, and functions shown in FIG. 6 are intended to be illustrative only, and the embodiments are not limited thereto. As depicted, the following layers and corresponding functions are provided: hardware and software layer 610, virtualization layer 620, management layer 630, and workload layer 640.

The hardware and software layer 610 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 620 provides an abstraction layer from which the following examples of virtual entities may be provided: virtual servers; virtual storage; virtual networks, including virtual private networks; virtual applications and operating systems; and virtual clients.

In one example, management layer 630 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and leveraging an artificial intelligence platform to enable management of word and image relationships in a combined vector space, and, more specifically, for establishing one or more continuous semantic relationships with word vectors, sentence vectors, and image vectors within the combined vector space.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
a server comprising at least one processing device and at least one memory device operably coupled to the at least one processing device; and
a knowledge base in operable communication with the server, the server configured to:
transmit a plurality of image vectors to a vector space resident within the knowledge base;
transmit a plurality of caption sentence vectors to the vector space, wherein a respective portion of the plurality of caption sentence vectors have one or more semantic relationships with a respective portion of the plurality of image vectors, thereby defining one or more combined image-word semantic relationships;

transmit a plurality of textual content word vectors to the vector space, wherein a respective portion of the plurality of word vectors have one or more semantic relationships with the respective portion of the plurality of image vectors and the respective portion of caption sentence vectors, thereby further defining the one or more combined image-word semantic relationships;

transmit a plurality of textual content sentence vectors to the vector space, wherein a respective portion of the plurality of textual content sentence vectors have one or more semantic relationships with the respective portion of the plurality of image vectors, the respective portion of caption sentence vectors, and the respective portion of the word vectors, thereby further defining the one or more combined image-word semantic relationships; and establish one or more continuous semantic relationships through the one or more combined image-word semantic relationships.

2. The system of claim 1, wherein the computer system is a cognitive system.

3. The system of claim 2, further comprising:
an artificial intelligence (AI) platform resident within the server, the AI platform in operable communication with the knowledge base, the AI platform comprising:
an image manager configured to facilitate execution of one or more operations by the server comprising one or more of:
extraction of a plurality of images from one or more image sources;
a natural language processing (NLP) manager configured to facilitate execution of the one or more operations by the server comprising one or more of:
extraction of at least a portion of textual content from one or more text data objects from one or more textual sources, wherein the extracted textual content includes a plurality of textual content words;
a caption manager configured to facilitate the execution of the one or more operations by the server comprising one or more of:
assign a caption to each image of the plurality of images, thereby generate the plurality of captioned images; and
a vector manager configured to facilitate the execution of the one or more operations by the server comprising one or more of:
vectorize each image of the plurality of images, thereby generate the plurality of image vectors;
vectorize each caption, thereby generate the plurality of caption sentence vectors;
vectorize each textual content word, of the plurality of textual content words, thereby generate the plurality of textual content word vectors;
generate the plurality of textual content sentence vectors; and
populate the vector space with the pluralities of vectors.

4. The system of claim 3, the caption manager further configured to:
filter the plurality of captioned images, wherein the caption manager is further configured to:

execute a contextual review of each captioned image of the plurality of captioned images;
determine, subject to the contextual review, a contextual relevance of each captioned image of the plurality of captioned images;
compare each respective contextual relevance determination with a relevance threshold; and
remove, subject to the comparison, those captioned images of the plurality of captioned images with a contextual relevance that does not meet or exceed the relevance threshold, thereby generating a plurality of relevant images and a respective plurality of relevant captions.

5. The system of claim 4, the vector manager further configured to:
tokenize at least a portion of the plurality of relevant captions, thereby generate a plurality of caption tokens;
generate a plurality of caption word vectors from the plurality of caption tokens; and
generate the plurality caption sentence vectors from the plurality of caption tokens.

6. The system of claim 3, the vector manager further configured to:
convert the plurality of textual content word vectors into the plurality of textual content sentence vectors.

7. The system of claim 3, the vector manager further configured to:
define the vector space as an image-word combined vector space with N-dimensional coordinates;
define, within the image-word combined vector space, a word vectors domain with the plurality of textual content word vectors;
define, within the image-word combined vector space, a sentence vectors domain with the plurality of caption sentence vectors and the textual content sentence vectors; and
define, within the image-word combined vector space, an image vectors domain with the plurality of image vectors.

8. The system of claim 3, the vector manager further configured to:
determine one or more sentiments associated with one or more image vectors of the plurality of image vectors;
determine one or more sentiments associated with one or more caption sentence vectors of the plurality of caption sentence vectors;
determine one or more sentiments associated with one or more textual content word vectors of the plurality of textual content word vectors; and
determine one or more sentiments associated with one or more textual content sentence vectors of the plurality of textual content sentence vectors.

9. The system of claim 3, the vector manager further configured to:
capture image-word linguistic regularities between the plurality of image vectors, the plurality of caption sentence vectors, the plurality of textual content word vectors, and the plurality of textual content sentence vectors.

10. A computer program product, comprising:
one or more computer readable storage media; and
program instructions collectively stored on the one or more computer storage media, the program instructions comprising:
program instructions to transmit a plurality of image vectors to a vector space;

program instructions to transmit a plurality of caption sentence vectors to the vector space, wherein a respective portion of the plurality of caption sentence vectors have one or more semantic relationships with a respective portion of the plurality of image vectors, thereby defining one or more combined image-word semantic relationships;

program instructions to transmit a plurality of textual content word vectors to the vector space, wherein a respective portion of the plurality of word vectors have one or more semantic relationships with the respective portion of the plurality of image vectors and the respective portion of caption sentence vectors, thereby further defining the one or more combined image-word semantic relationships;

program instructions to transmit a plurality of textual content sentence vectors to the vector space, wherein a respective portion of the plurality of textual content sentence vectors have one or more semantic relationships with the respective portion of the plurality of image vectors, the respective portion of caption sentence vectors, and the respective portion of the word vectors, thereby further defining the one or more combined image-word semantic relationships; and program instructions to establish one or more continuous semantic relationships through the one or more combined image-word semantic relationships.

11. The computer program product of claim 10, further comprising:

program instructions to define the vector space as an image-word combined vector space with N-dimensional coordinates;

program instructions to define, within the image-word combined vector space, a word vectors domain with the plurality of textual content word vectors;

program instructions to define, within the image-word combined vector space, a sentence vectors domain with the plurality of caption sentence vectors and the textual content sentence vectors;

program instructions to define, within the image-word combined vector space, an image vectors domain with the plurality of image vectors;

program instructions to establish, within the image-word combined vector space, the one or more continuous semantic relationships between the word vectors domain, the sentence vectors domain, and the image vectors domain; and program instructions to capture image-word linguistic regularities between the plurality of image vectors, the plurality of caption sentence vectors, the plurality of textual content word vectors, and the plurality of textual content sentence vectors.

12. A computer-implemented method comprising:

transmitting, through a vector manager embedded within a server, a plurality of image vectors to a vector space;

transmitting, through the vector manager, a plurality of caption sentence vectors to the vector space, wherein a respective portion of the plurality of caption sentence vectors have one or more semantic relationships with a respective portion of the plurality of image vectors, thereby defining one or more combined image-word semantic relationships;

transmitting, through the vector manager, a plurality of textual content word vectors to the vector space, wherein a respective portion of the plurality of word vectors have one or more semantic relationships with the respective portion of the plurality of image vectors and the respective portion of caption sentence vectors, thereby further defining the one or more combined image-word semantic relationships;

transmitting, through the vector manager, a plurality of textual content sentence vectors to the vector space, wherein a respective portion of the plurality of textual content sentence vectors have one or more semantic relationships with the respective portion of the plurality of image vectors, the respective portion of caption sentence vectors, and the respective portion of the word vectors, thereby further defining the one or more combined image-word semantic relationships; and establishing, through the server, one or more continuous semantic relationships through the one or more combined image-word semantic relationships.

13. The method of claim 12, wherein transmitting a plurality of caption sentence vectors to the vector space comprises:

extracting a plurality of images from one or more image sources;

assigning a caption to each image of the plurality of images, thereby generating a plurality of captioned images; and filtering the plurality of captioned images comprising:
executing a contextual review of each captioned image of the plurality of captioned images;
determining, subject to the contextual review, a contextual relevance of each captioned image of the plurality of captioned images;
comparing each respective contextual relevance determination with a relevance threshold; and
removing, subject to the comparison, those captioned images of the plurality of captioned images with a contextual relevance that does not meet or exceed the relevance threshold, thereby generating a plurality of relevant images and a respective plurality of relevant captions.

14. The method of claim 13, wherein generating the plurality of caption sentence vectors comprises:

tokenizing at least a portion of the plurality of relevant captions, thereby generating a plurality of caption tokens;

generating a plurality of caption word vectors from the plurality of caption tokens; and generating the plurality caption sentence vectors from the plurality of caption tokens.

15. The method of claim 12, wherein transmitting the plurality of textual content word vectors and the plurality of textual content sentence vectors to the vector space comprises:

extracting at least a portion of textual content from one or more text data objects from one or more textual sources, wherein the extracted textual content includes a plurality of textual content words;

vectorizing each textual content word of the plurality of textual content words, thereby generating the plurality of textual content word vectors; and generating, from the textual content word vectors, the plurality of textual content sentence vectors.

16. The method of claim 15, wherein generating the plurality of textual content sentence vectors comprises:

converting the plurality of textual content word vectors into the plurality of textual content sentence vectors.

17. The method of claim 12, further comprising:

defining the vector space as an image-word combined vector space with N-dimensional coordinates.

18. The method of claim 17, further comprising at least partially defining within the image-word combined vector space:
- a word vectors domain with the plurality of textual content word vectors;
- a sentence vectors domain with the plurality of caption sentence vectors and the textual content sentence vectors; and
- an image vectors domain with the plurality of image vectors.

19. The method of claim 12, further comprising:
- determining one or more sentiments associated with one or more image vectors of the plurality of image vectors;
- determining one or more sentiments associated with one or more caption sentence vectors of the plurality of caption sentence vectors;
- determining one or more sentiments associated with one or more textual content word vectors of the plurality of textual content word vectors; and
- determining one or more sentiments associated with one or more textual content sentence vectors of the plurality of textual content sentence vectors.

20. The method of claim 12, further comprising:
- capturing image-word linguistic regularities between the plurality of image vectors, the plurality of caption sentence vectors, the plurality of textual content word vectors, and the plurality of textual content sentence vectors.

* * * * *